(12) United States Patent
Sala

(10) Patent No.: US 7,284,349 B1
(45) Date of Patent: Oct. 23, 2007

(54) FISH HOOK STORAGE DEVICE

(76) Inventor: John Sala, 2902 Cascade St., Erie, PA (US) 16508

( * ) Notice: Subject to any disclaimer, the term of this patent is extended or adjusted under 35 U.S.C. 154(b) by 0 days.

(21) Appl. No.: 11/416,416

(22) Filed: May 2, 2006

(51) Int. Cl.
*A01K 97/06* (2006.01)

(52) U.S. Cl. ...................................... 43/57.2

(58) Field of Classification Search ............... 43/57.2, 43/57.1, 57.3
See application file for complete search history.

(56) References Cited

U.S. PATENT DOCUMENTS

| | | | | |
|---|---|---|---|---|
| 566,595 A * | 8/1896 | Magnuson | ................... | 43/57.2 |
| 595,998 A * | 12/1897 | Garland | ..................... | 43/57.2 |
| 2,041,231 A * | 5/1936 | Collins | ........................ | 43/57.2 |
| 2,041,232 A * | 5/1936 | Collins | ........................ | 43/57.2 |
| 2,080,794 A * | 5/1937 | Tullio | .......................... | 43/57.2 |
| 2,208,649 A * | 7/1940 | Strom | ......................... | 43/57.2 |
| 2,488,160 A * | 11/1949 | Siegfried | .................... | 43/57.2 |
| 2,559,780 A * | 7/1951 | Martinson | ................... | 43/57.2 |
| 2,578,424 A * | 12/1951 | Hart | ............................ | 43/57.2 |
| 2,595,463 A * | 5/1952 | Kamps | ........................ | 43/57.2 |
| 2,659,997 A * | 11/1953 | Guestinger | .................. | 43/57.2 |
| 2,730,833 A * | 1/1956 | Newell | ........................ | 43/57.2 |
| 2,749,654 A * | 6/1956 | Harris | ......................... | 43/57.2 |
| 2,750,706 A * | 6/1956 | Seals | ........................... | 43/57.2 |
| 2,791,863 A * | 5/1957 | Sweeney | ..................... | 43/57.2 |
| 2,836,005 A * | 5/1958 | Jerdee | ........................ | 43/57.2 |
| 2,879,619 A * | 3/1959 | Peterson | ..................... | 43/57.2 |
| 3,033,487 A * | 5/1962 | Walker | ....................... | 43/57.2 |
| 3,122,855 A * | 3/1964 | Collier | ........................ | 43/57.2 |
| 3,172,228 A * | 3/1965 | Hans | .......................... | 43/57.1 |
| 3,564,755 A * | 2/1971 | Lindgren, Sr. | ............... | 43/57.2 |
| 3,758,977 A * | 9/1973 | Miller | ......................... | 43/57.1 |
| 3,769,741 A * | 11/1973 | Hessler et al. | ............... | 43/57.1 |
| 4,186,511 A * | 2/1980 | Slacter | ........................ | 43/57.1 |
| 4,208,825 A * | 6/1980 | Barnes | ........................ | 43/57.1 |
| 4,281,470 A * | 8/1981 | Anderson | .................... | 43/57.1 |
| 4,383,385 A * | 5/1983 | Myers | ......................... | 43/57.1 |
| 4,577,433 A * | 3/1986 | Jones | .......................... | 43/57.2 |
| 4,631,856 A * | 12/1986 | Born | ........................... | 43/57.2 |
| 4,924,621 A * | 5/1990 | Hawranik et al. | ........... | 43/57.2 |
| 4,961,281 A * | 10/1990 | Listebarger, Jr. | ............. | 43/57.2 |
| 5,018,298 A * | 5/1991 | Spears | ........................ | 43/57.2 |
| 5,157,862 A * | 10/1992 | Companiony | ............... | 43/57.2 |
| 5,857,285 A * | 1/1999 | Little | .......................... | 43/57.1 |
| 2005/0178046 A1* | 8/2005 | Burdette et al. | ............. | 43/57.1 |

FOREIGN PATENT DOCUMENTS

EP        1044606 A1 * 10/2000

(Continued)

*Primary Examiner*—Darren W. Ark
(74) *Attorney, Agent, or Firm*—Richard K Thomson

(57) ABSTRACT

A device for storing fish hooks which have lengths of leader attached in an orderly fashion. A thin, generally rectangular piece of plastic has two rows of posts, one extending axially outwardly in alignment with each lateral face. The two rows of posts are laterally offset from one another to facilitate attachment and removal of a loop in the distal end of the leader. A layer of elastomeric material coats at least ⅓ of each face at the opposite end of the body. The hook which is tied to the proximate end of the leader is embedded in the elastomeric layer to maintain the fish hooks in an ordered array. A second embodiment includes an integral storage compartment for lead shot.

3 Claims, 4 Drawing Sheets

FOREIGN PATENT DOCUMENTS

| | | | | |
|---|---|---|---|---|
| FR | 2229252 A | * | 1/1975 | |
| JP | 7-203819 A | * | 8/1995 | |
| JP | 10-84831 A | * | 4/1998 | |
| JP | 2001-128603 A | * | 5/2001 | |
| JP | 2001-231422 A | * | 8/2001 | |
| JP | 2003-169579 A | * | 6/2003 | |
| JP | 2005-160347 A | * | 6/2005 | |
| JP | 2005-245396 A | * | 9/2005 | |

* cited by examiner

FISH HOOK STORAGE DEVICE

BACKGROUND AND SUMMARY OF THE INVENTION

The present invention is directed to the area of sporting goods. More particularly, the present invention is directed to a device to neatly store fish hooks which are attached to a length of fishing line known as leader.

Fishing tackle has a tendency to become snarled in a tackle box. One of the chief culprits is the fish hook which, left to work its wiles, will embed itself in whatever crosses its path and, if possible, will foul itself with leader, other hooked devices such as spoons, lures and the like, and do it in such a way as to ensure its ability to gouge the fisherman as she/he seeks to untangle the snarl.

The present invention is directed to a storage device of fish hooks which are attached to a leader to keep the hooks neatly arrayed so that they may be easily accessed as desired. Other attempts to provide storage for fish hooks have been made. One such device involves the use of tensioning springs which tend to become displaced and end up being a greater snarled nuisance that the leadered hooks themselves. It is the intention of the present invention to provide a simple, yet elegant means to store hooks so that they are available when needed.

The storage device of the present invention comprises a) a thin, generally rectangular body constructed of durable plastic; b) the rectangular body having a first face and a second opposing face, a first end of the body having a first row of posts aligned with said first face and a second row of posts aligned with said second opposing face, said first and second rows extending axially outwardly from said first end; c) a second end having a first elastomeric coating on one side and a second elastomeric coating on an opposite side, said first and second elastomeric coatings extending over about ⅓ of a length of said body; whereby a loop formed in a distal end of the length of leader is hooked over one of the posts and the fish hook is embedded in one of the first and second coatings to secure the fish hook to said storage device. If the leader is short or of standard length, the hook will be embedded on the same side as the post to which it is secured. If the leader is of a longer length, the leader can be wrapped around one or both ends of the body and the hook embedded in the elastomeric layer to which the hook can reach.

Preferably, the first and second rows of posts are laterally offset from one another to afford easy access when attaching or removing a leader loop. Also, preferably, the durable plastic is transparent and the body has indicia of length etched therein. An additional feature of the device is a compartment formed in a portion of the body, the compartment having a closure which snaps shut for retaining items, such as lead shot, therein.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
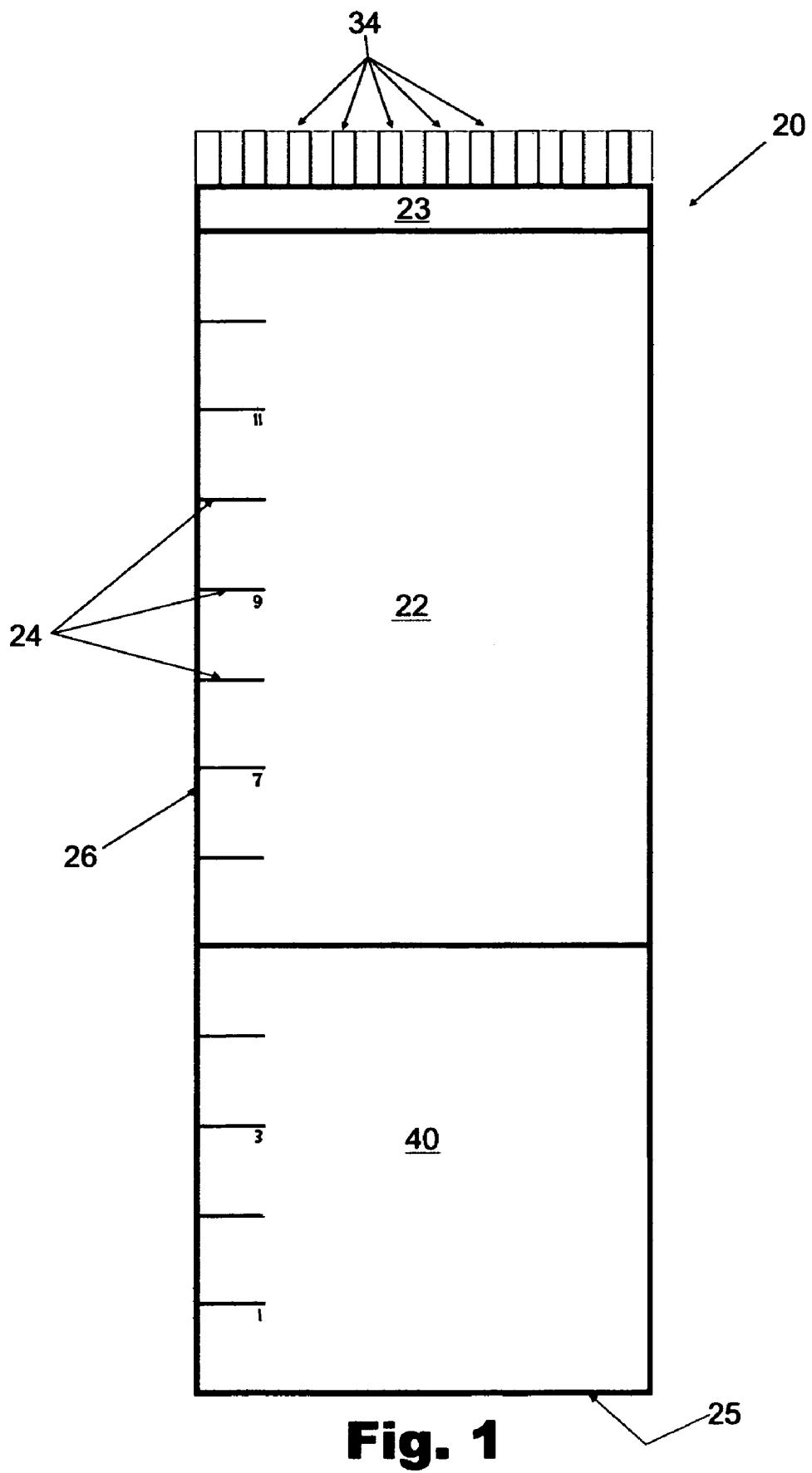
FIG. 1 is a front view of a first embodiment of the fish hook storage device of the present invention.
Figure 2:
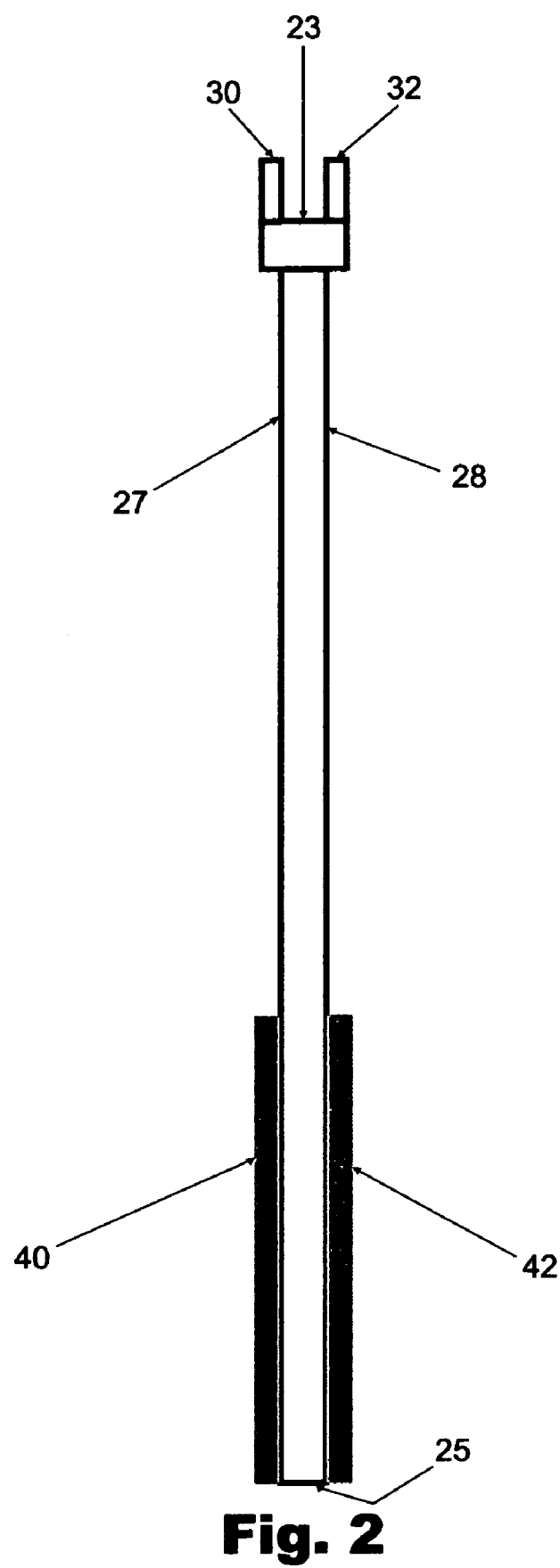
FIG. 2 is a side view of the first embodiment of the storage device.
Figure 3:
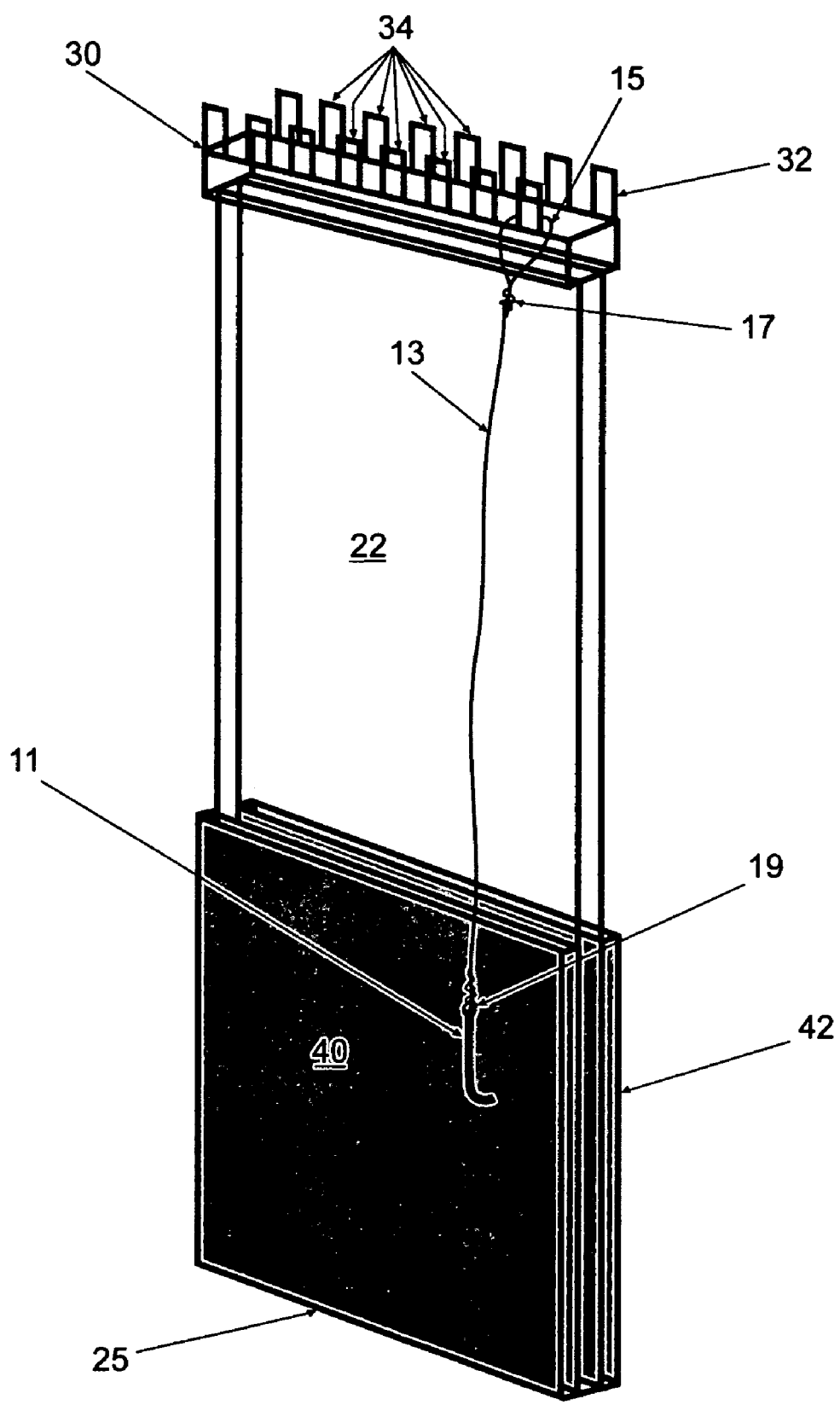
FIG. 3 is a front perspective view of the first embodiment of the storage device.

A first embodiment of the fish hook storage device of the present invention is depicted in FIGS. 1-3 generally at 20. Storage device 20 comprises a thin, generally rectangular piece 22 of plastic which is preferably transparent. Indicia 24 of length such as inches are meted out along an edge 26 of at least one, and preferably both, faces 27, 28. The indicia 24 can be used to measure a fish, length of leader, etc., as may be desirable in the context of fishing. First and second rows (30, 32) of posts 34 extend axially outwardly from first end 23 of body 22 and are aligned with (parallel to) faces 27, 28 respectively (FIG. 2). The posts of the first row of posts 30 being laterally offset from respective posts of said second row of posts such that a plane extending through each of the longitudinal axes of the first row of posts 30 in a direction both orthogonal to said first face 27 and toward the second row of posts 32 does not intersect any of the longitudinal axes of the second row of posts 32. At least ⅓ of each face 27, 28 of body 22 is coated with an elastomeric layer 40, 42 adjacent second end 25 thereof. Elastomeric layers 40, 42 may be made of real or artificial rubber and are designed to have fish hooks embedded therein repeatedly, so that the material making up the elastomeric layers 40, 42 is, of necessity, durable and tear-resistant.

As depicted in FIG. 3, a loop 15 of a first end 17 of leader 13 is hooked on a post 34. The leader 13 is stretched along the body 22 of storage device 20 and hook 11 which is knotted to the opposite end 19 of leader 13 is embedded in elastomeric layer 40. Hooks 11 with leaders 13 attached thereto will be maintained in an orderly array secured to storage device 20 until the fisherman removes one of them to secure it to his fishing line. It will be appreciated that should leader 13 be of longer length, it may be wrapped around the end 25 of body 22 and embedded in elastomeric layer 42. Similarly, storage device 20 can accommodate different sizes and style of hooks (treble, for example) as well as small lures such as spoons, without departing from the scope of the invention.

Figure 4:
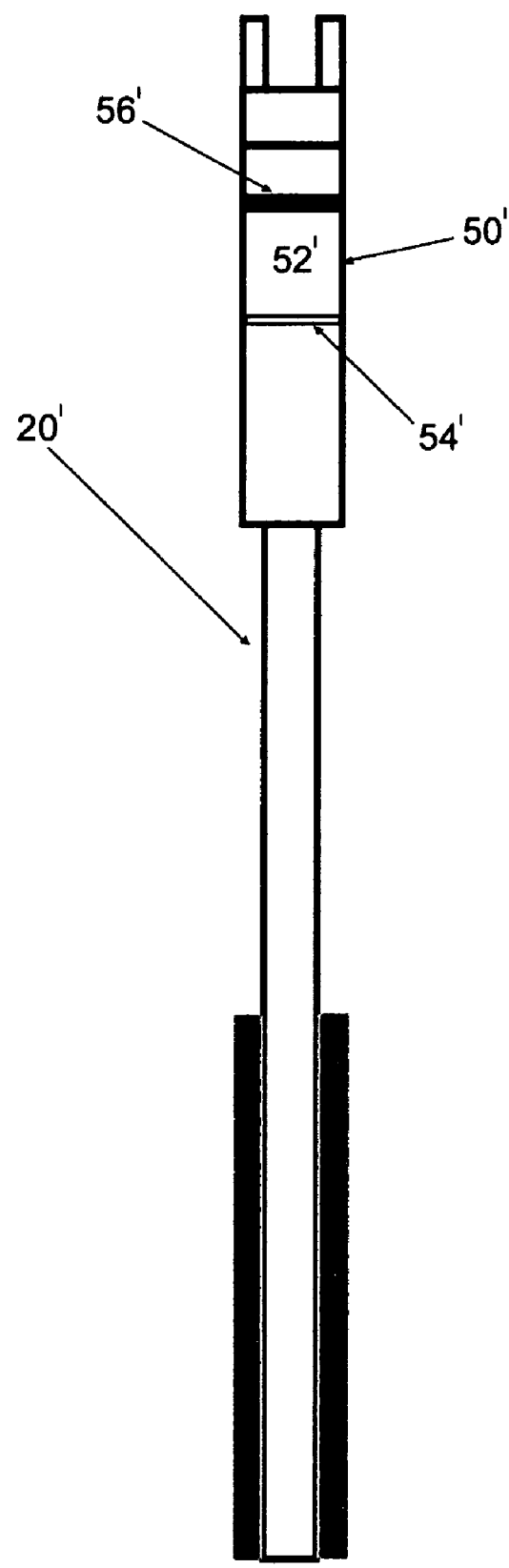
FIG. 4 is a side view of a second embodiment of the storage device of the present invention.

A second embodiment of fish hook storage device of the present invention is depicted in FIG. 4 generally at 20'. In addition to the features discussed in connection with the first embodiment, storage device 20' is equipped with a compartment 50' with a closure 52' which has a living hinge 54' at a first end and a lip 56' which snaps shut on the opposite end. This compartment can house one or more sizes of lead shot which is used in rigging the fishing line as one of the hooks 11 is attached thereto. The inclusion of compartment 50' facilitates the rigging of the fishing line by putting everything needed at the fisherman's fingertips.

Various changes, alternatives and modifications will become apparent to one of ordinary skill in the art after reading the foregoing specification. It is intended that all such changes, alternatives and modifications as fall within the scope of the appended claims be considered part of the present invention.

I claim:

1. A device for storing fish hooks having a length of leader attached thereto, said device comprising:

a) a thin, generally rectangular body constructed of durable plastic;

b) said rectangular body having a first face and a second opposing face, a first end of said rectangular body having a first row of posts aligned with said first face and a second row of posts aligned with said second opposing face, each post in said first row of posts having a longitudinal axis extending in a direction parallel to said first face, each post in said second row of posts having a longitudinal axis extending in a direction parallel to said second face, each post of said first row of posts being laterally offset from a respective post of said second row of posts such that a plane extending through each of said longitudinal axes of said first row of posts in a direction both orthogonal to said first face and toward the second row of posts does not intersect any of the longitudinal axes of said second row of posts, and said first and second rows of posts extending axially outwardly from said first end; and c) a second end of said rectangular body having a first planar layer of elastomeric coating on a portion of said first face and a second planar layer of elastomeric coating on an opposing portion of said second face, said first and second elastomeric coatings extending over only about ⅓ of a length of said body;

whereby a loop formed in a distal end of the length of leader is hooked over one of said posts and the fish hook is embedded in one of said first and second coatings to secure the fish hook to said storage device.

2. The device for storing fish hooks of claim 1 wherein said durable plastic is transparent and said body has indicia of length etched therein.

3. The device of claim 1 further comprising a compartment formed integrally as a portion of said body, said compartment having a pivoting flap closure which snaps shut for retaining items, such as lead shot, therein.

* * * * *